United States Patent
Delattre et al.

[11] Patent Number: 5,643,052
[45] Date of Patent: Jul. 1, 1997

[54] METHOD FOR RENEWING GRINDING WHEEL SURFACES AND DISK AND MACHINE FOR CARRYING OUT SAID METHOD

[75] Inventors: Luc Delattre, Maxence; Pascal Daboudet, Bouffemont; Jean-Luc Labat, Barrois, all of France

[73] Assignee: Essilor International, Creteil, France

[21] Appl. No.: 325,280

[22] PCT Filed: May 21, 1993

[86] PCT No.: PCT/FR93/00497

§ 371 Date: Nov. 22, 1994

§ 102(e) Date: Nov. 22, 1994

[87] PCT Pub. No.: WO93/24274

PCT Pub. Date: Dec. 9, 1993

[30] Foreign Application Priority Data

May 26, 1992 [FR] France ................ 92 06 413

[51] Int. Cl.[6] ................ B24B 49/00; B24B 51/00
[52] U.S. Cl. ................ 451/21; 451/42; 451/43
[58] Field of Search ................ 451/5, 8, 21, 41, 451/42, 43, 384

[56] References Cited

U.S. PATENT DOCUMENTS

| 3,792,238 | 2/1974 | Samoel ................ 235/61.11 J |
| 3,798,845 | 3/1974 | Stevens ................ 451/21 |
| 4,266,374 | 5/1981 | Asano et al. ................ 451/21 |
| 4,359,841 | 11/1982 | Barth et al. ................ 451/21 |
| 4,391,066 | 7/1983 | Munekata et al. ................ 451/21 |
| 4,530,187 | 7/1985 | Koide et al. ................ 451/21 |
| 4,653,235 | 3/1987 | Farmer . |
| 4,900,252 | 2/1990 | Liefke et al. . |
| 5,042,205 | 8/1991 | Girard et al. ................ 451/21 |
| 5,144,773 | 9/1992 | Flores et al. ................ 451/8 |
| 5,161,333 | 11/1992 | Lecerf et al. ................ 451/21 |

FOREIGN PATENT DOCUMENTS

| 225077 | 6/1987 | European Pat. Off. . |
| 300317 | 1/1989 | European Pat. Off. . |
| 2731232 | 1/1979 | Germany ................ 451/42 |
| 3419632 | 11/1984 | Germany . |
| 3518902 | 11/1986 | Germany . |
| 4012658 | 9/1991 | Germany . |
| WO 89/05711 | 6/1989 | WIPO . |

Primary Examiner—D. S. Meislin
Assistant Examiner—Derris Banks
Attorney, Agent, or Firm—Quarles & Brady

[57] ABSTRACT

Method for renewing grinding wheel surfaces in a machine for grinding ophthalmic lenses, comprising one or more diamond wheels (2,3,4,5), gripping members (7,8) capable of receiving an ophthalmic lens, and control. Once wheel wear is detected, the surface is renewed using an abrasive disk (9) fitted to the grinding machine in place of a lens in the gripping members. The invention also concerns a disk (9) for carrying out the method, with at least the peripheral surface consisting of abrasive material. A machine for gripping ophthalmic lenses and carrying out the method is also described.

15 Claims, 2 Drawing Sheets

METHOD FOR RENEWING GRINDING WHEEL SURFACES AND DISK AND MACHINE FOR CARRYING OUT SAID METHOD

BACKGROUND OF THE INVENTION

The present invention relates to a method for renewing the abrasive surface of grinding wheels. The method is particularly suitable for renewing the surface of wheels for grinding machines used in the ophthalmic field and comprising one or several diamond grinding wheels, gripping means designed to receive an ophthalmic lens, and control means. The invention also relates to a disk and a machine for carrying out the method.

Grinding machines are used in the ophthalmic field for trimming, bevelling or grooving ophthalmic lenses.

A trimming operation consists in adapting the generally circular contour of an ophthalmic lenses to the contour of the frame designed to receive it. It consequently consists in removing part of the material of the periphery of the lens.

Beveling of an ophthalmic lens, which is carried out after trimming, enables the cross-section of the peripheral edge of the lens to be adapted so that it fits into the groove which the spectacle frame usually incorporates. Beveling of the lens consists consequently in providing a generally triangular-shaped bevel or rib on the peripheral edge of the lens.

A grooving operation on an ophthalmic lens may also be carried out on a lens after it has been trimmed. This enables the cross-section of the peripheral edge of the lens to be adapted so that it can be mounted in certain types of frame. In effect, some frames do not include a groove over the whole internal perimeter of the parts designed to receive the lens; rather, it sometimes happens, for example, that the frame only matches the top part of the lens whereas the lower part of the lens is held by a transparent wire. In such cases, it is necessary to provide a groove or a channel which is most frequently triangular or semi-circular in shape, on the peripheral edge of the lens.

Most frequently, these three operations are carried out on one and the same grinding machine, fitted with a train of grinding wheels. Such machines are known and available commercially.

Grinding machines of this type typically comprise one or several diamond grinding wheels frequently coupled together to constitute a train of grinding wheels, gripping means designed to receive the ophthalmic lens to be machined, and control means. The control means are designed to control the rotation of the grinding wheel and the gripping means which hold the lens; the control means additionally control the relative displacement between the lens and the grinding wheel.

Such a grinding machine generally includes a sensing finger which is designed to follow a template corresponding to the particular shape of the lens. It may additionally, if appropriate, store the various shapes a lens may be desired to have in memory, and in this case, the sensing finger most frequently follows the contour of a disk.

Such a grinding machine generally operated in the following manner:

Initially a trimming wheel cuts out the lens to be machined after which a beveling or grooving wheel provides the bevel or groove in the cut-out lens.

Such machines and their operation are more particularly described in French patent number 2,543,039 in the name of the present applicant/assignee.

Known grinding machines and more particularly the one described in the said patent, operate in a highly satisfactory manner. They however do not provide a satisfactory solution to the problem of wear of the grinding wheel.

On such grinding machines, diamond grinding wheels are used. These generally consist of a disk, the periphery of which is covered with layer consisting of a binder incorporating fine diamond particles. The diamond layer can be produced by electro-erosion or by sintering. During repeated machining operation on lenses by the grinding machines, the grinding wheel surface becomes progressively more dull and loses its abrasive power. The loss is due to the diamond particles in contact with the lens to be machined gradually getting worn down. It is obvious that although the phenomenon is described for the case of diamond grinding wheels, it also occurs with other types of grinding wheel.

The wear of the grinding wheel may, under certain conditions, be compensated by a self-sharpening effect of the wheel on the glass to be machined. During machining, the ophthalmic lens being ground wears down the grinding wheel and thus partially renews the surface thereof. Nevertheless, such self-sharpening does not provide a satisfactory solution to the problem of wear of grinding wheels. Firstly, ophthalmic lenses are now constituted of very differing glasses having varying hardnesses which leads to poor self-renewal of the abrasive surface. In particular, certain glass-plastics composites may form a fine film on the wheel, the effect of which is to prevent or slow down self-renewal. Secondly, self-sharpening generally involves a deleterious modification to the shape of the wheel surface. Such self-sharpening does not in fact wear down the wheel uniformly and, if for example self-sharpening has occurred with a particular series of lenses, the resulting shape of the grinding wheel will doubtless have become modified to match the shape of the lenses. This consequently involves a risk of damaging lenses of a different shape during subsequent machining. This problem is obviously crucial in the case of grinding wheels for grooving and bevelling.

Manual renewal of grinding wheel surfaces has thus been proposed. When the operator considers that wheel is blunt, he employs a stick of alumina or carborundum or a material of similar hardness which he passes manually over the wheel surface to renew it. There are many disadvantages associated with this procedure:

Firstly, it leads to premature wear of the diamond surface when the resharpening operation are repeated frequently, or when the operator performs the operation too brutally. Even if the grinding wheel is still working, the operator may judge that machining is not proceeding fast enough and decide to renew the grinding wheel surface prematurely. This, bearing in mind the high cost of the grounding wheel, is a major disadvantage.

Secondly, the manual procedure, and despite all the experience the operator may possess, causes deformation of the periphery of the grinding wheel. In the case of a trimming wheel, with a flat peripheral cross-section, the alumina or carborundum stick must be held exactly parallel to the edge of the wheel to avoid deforming its profile. The operation is very difficult to carry out in a satisfactory way. In the case of a bevelling or grooving wheel which has a projecting or recessed profile, manual resharpening using an alumina or carborundum stick causes appreciable deformation of the machining profile of the grinding wheel. Because of this, after resharpening, the wheel no longer has a suitable shape to ensure completely satisfactory machining.

German Patent Application 4,012,658 discloses a system for truing a grinding wheel applied to a machine for grinding ophthalmic lenses. According to this document, the grinding wheel is trued using a tool that is mounted between the spindles in place of the lens. This system does not however enable the problem of grinding wheel surface renewal to be resolved. In all cases, the distance between the grinding wheel and tool axes stays practically constant and it is only possible to true the profile, but to not renew the grinding wheel surface. Moreover, the system has no provisions whatsoever for detecting when the grinding wheel needs truing.

SUMMARY OF THE INVENTION

The present invention discloses a method for renewing grinding wheel surfaces which overcomes the disadvantages of the prior art. It also discloses a disk for grinding wheel surface renewal and a grinding machine for implementing the method.

Grinding wheel surface renewal is, thanks to the present invention, rapid and reliable. It enables the machining profiles of the grinding wheel to be carefully preserved, thus leaving the tool's performance intact.

It also prevents premature wear of the grinding wheel by allowing accurate checking of their degree of wear to be performed.

It also allows surface renewal adapted to the various materials of which the wheel may be made to be carried out.

The present invention provides a method for renewing grinding wheel surfaces in a machine for grinding ophthalmic lenses, comprising one or several diamond grinding wheels, gripping means designed to receive an ophthalmic lens and control means, in which the method comprises a step for detecting wear of the grinding wheel, surface renewal being carried out using a disk of an abrasive material fitted on the grinding machine in the place of a lens in the gripping means for said lenses.

According to one embodiment of the invention, the method comprises a step for automatically detecting the presence and nature of the disks fitted in said gripping means.

In one embodiment, the step for detecting the wear of the grinding wheel consists in measuring the time to machine an ophthalmic lens.

In another embodiment, the step for detecting the wear of the grinding wheel consists in measuring the power consumed by the means for driving the diamond grinding wheel in rotation and/or the means for driving the gripping means in rotation.

The invention also provides a disk for carrying out the method, in which at least the peripheral surface of said disk is constituted by an abrasive material, and it includes in its central portion means for providing coupling to the said gripping means of said machine.

The disk further comprises, at its central portion, identification means consisting of a plurality of holes. The abrasive material advantageously consists of alumina or carborundum.

The invention also provides a machine for grinding ophthalmic lenses for carrying out the above method, comprising one or several diamond grinding wheels, gripping means designed to receive an ophthalmic lens and control means for controlling the rotation and the relative position of said grinding wheels and said lens, further comprising means for detecting the wear of said grinding wheel or wheels by carrying out comparison with a target value for the time needed to machine the lens or for the power consumed by the means for driving said grinding wheel and/or said gripping means in rotation.

In one embodiment of the invention, the machine further comprises means for detecting the possible presence and the nature of the disk for renewing the surface of said grinding wheels, fitted in said gripping means in the place of said lens.

In a further embodiment of the invention, the detection means consist of a photoelectric cell and a light source.

BRIEF DESCRIPTION OF THE DRAWINGS

The features and advantages of the present invention will become more clear from the description that follows provided by way of example and with reference to the attached drawings in which.

DETAILED DESCRIPTION OF THE PREFERRED EMBODIMENTS

Figure 1:
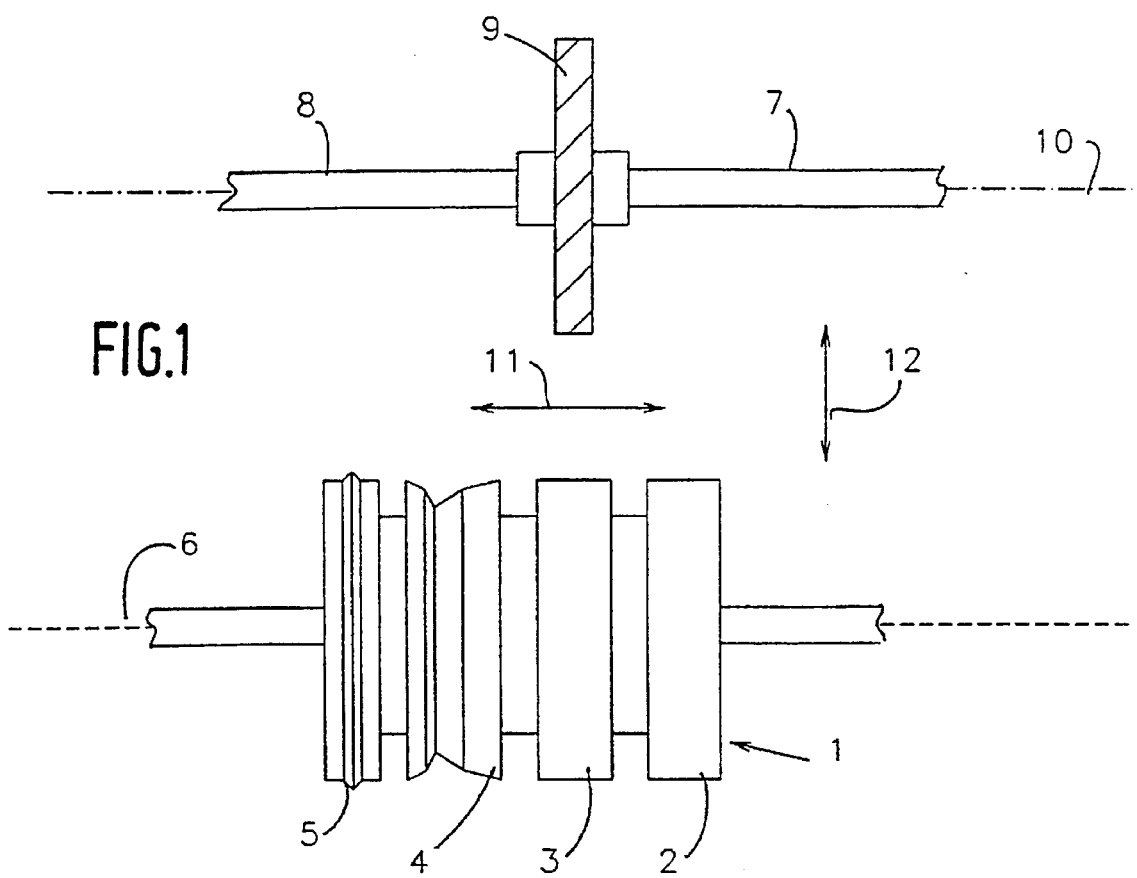
FIG. 1 is a diagrammatical view of the lens grinding machines.

FIG. 1 is a diagrammatical view of a machine for grinding lenses; only those parts directly concerned by the present invention are shown in FIG. 1. Such a machine comprises, in a manner known per se, a set of diamond grinding wheels, gripping means designed to receive an ophthalmic lens and control means for controlling the rotation and the relative position of the said grinding wheels and said lens. Only one train of grinding wheels 1 has been shown on FIG. 1 and this for example consists of four grinding wheels grouped together consisting of a wheel 2 for trimming plastics lens blanks, a wheel 3 for trimming glass lens blanks, a grooved wheel 4 for finishing and beveling, and a ribbed wheel 5 for finishing and grooving. Wheel train of 1 is designed to rotate on an axis 6 driven by a motor which is not shown, controlled by control means. The machine further includes gripping means consisting, for example in FIG. 1 of two carrier spindles 7 and 8 designed to clamp a lens. In FIG. 1, the situation in which disk 9 according to the invention is mounted in the gripping means 7, 8 in place of the lens is illustrated. The complete assembly consisting of the gripping mean 7, 8 and the lens or the disk 9 provided in its place is designed to rotate about the axis 10, driven by a motor, not shown, controlled by control means. The control means thus control the rotation of the grinding wheel train 1 about axes 6, and rotation of the complete assembly consisting of gripping means 7, 8 and disk 9 about axes 10. The control means further control relative displacement of the train of grinding wheels 1 of the assembly 7, 8, 9 in the direction of the axes 6 and 10 as indicated by arrow 11 on FIG. 1, and in the direction perpendicular to the axes 6 and 10 as indicated in FIG. 1 by the arrow 12. A disk 9 with a generally plane peripheral section has been shown in FIG. 1, this disk being suitable for renewing the surface of cylindrical grinding wheels, such as the blank trimming wheels 2 or 3.

The method consists in fitting an abrasive material disk 9 into the gripping means 7, 8 and then renewing the surface of the grinding wheel using said disk. For surface renewal, the disk 9 and the train of grinding wheels are driven in rotation and the control means ensure the disk 9 is positioned facing the grinding wheel to be re-sharpened, by relative displacement in the direction of the axis indicated by arrow 11. Following this, the command means ensure the disk 9 and the grinding wheel move relatively one with respect to the other so that they come into contact for the period necessary to renew the surface of the grinding wheel. Obviously, this time will depend on the latter's composition as well as on the hardness of the abrasive disk 9. According to the invention, surface renewal is carried out after wear of the grinding wheel has been detected, as will be described in more detail below.

The control means have not been shown in FIG. 1 as their exact manner of operation is not in any way essential to a full understanding of the invention. Conventionally, they can comprise a sensing finger provided with a sensing probe or any other suitable measuring device. The control means may include a specific program ensuring good surface renewal, and which is for example stored in the machine in a support such as an EPROM-type programmable memory. In fact, the invention can be adapted to all type of automatic grinding machine having widely varying control and gripping means.

Figure 2:
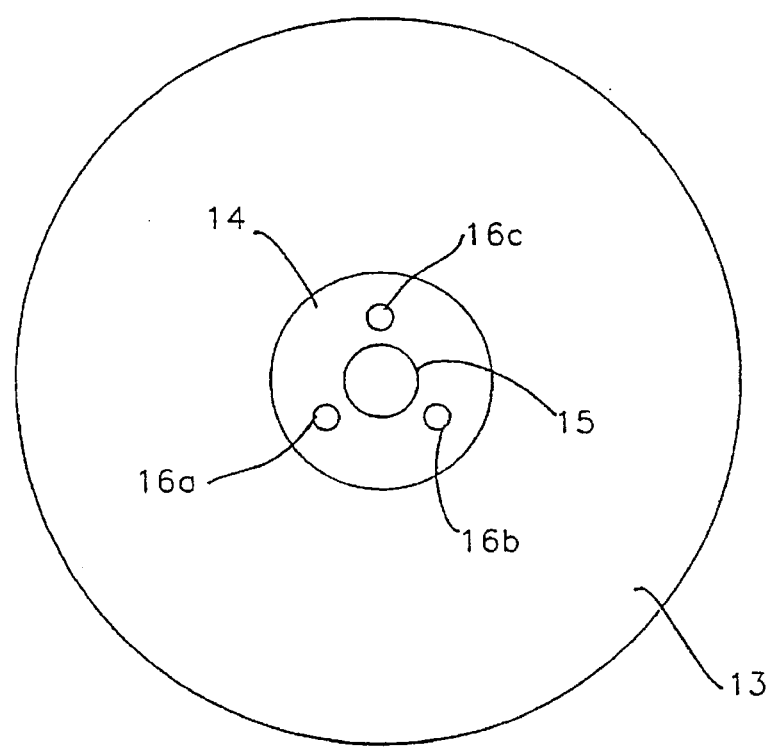
FIG. 2 shows a disk according to the present invention.

FIG. 2 shows a disk according to the present invention. Such a disk has a peripheral portion 13 consisting of an abrasive material. In the case of a diamond grinding wheel, the material can for example be alumina or carborundum. The disk in FIG. 2 has, at its central portion 14, means 15 for coupling it to the gripping means of the grinding machine in which it is to be employed. In the case of FIG. 2, the coupling means 15 match the structure of the spindles 7, 8, so that the disk 9 can be adapted to be held and driven in rotation by gripping means of the grinding machine. The disk in FIG. 2 furthermore carries at its central portion 14, identification means consisting of a plurality of holes 16a, 16b, 16c allowing the various disks to be identified. Actually, as has been seen above, grinding machines are most frequently fitted with a train of wheels of differing hardnesses and contours, and it is necessary to use, for renewing the surface of the various grinding wheels, disks of various compositions and contours. The identification means allow the varying disks to be recognized.

In the embodiment in FIG. 2, the identification means consist of holes 16a, 16b, 16c provided in the central portion of the disk on the same circle concentric with the disk. The disk is identified by counting the number of holes. Counting can by be done by the operator in the case where he has no other means of identification available such as, for example, labelling, color of the grinding wheel etc. Counting can also be done by the machine thanks to the provision of means for detecting the presence and the nature of the grinding wheel. In the case of FIG. 2, the disk comprises, as the means of identification, holes 16a, 16b, and 16c and the detection means of the grinding machine advantageously consist of a light source fixed on the machine frame and a photoelectric cell disposed opposite said source. The light source and the photoelectric cell are arranged such that when a disk is fitted onto the grinding machine, the light source and the photoelectric cell are on opposite sides of the disk and the light beam leaving the light source hits the photoelectric cell after having passed through one of the holes 16a, 16b, 16c. When the disk rotates, it is possible, thanks to the presence of the source and the light cell, to count the number of light flashes arriving at the photoelectric cell thus enabling the number of holes on the disk to be counted. Advantageously the source is a source of infrared light and the cell is adapted to detect infrared so that spurious detection due to ambient light can be avoided. Obviously, the source and the cell are only one possible way of providing the detecting means which may be present on the machine. Their function can also be provided by other means.

Figure 3:
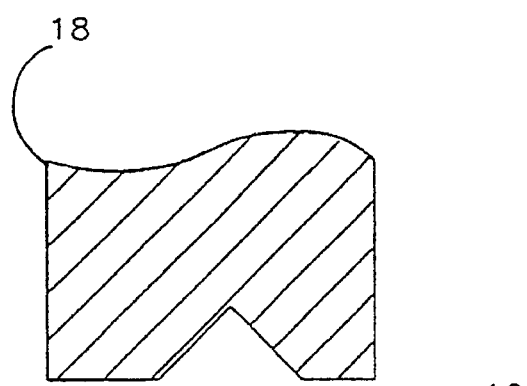
FIG. 3 is a detailed view on a larger scale, of the profile of a disk according to the invention.

FIG. 3 shows detail, on a larger scale, of the contour of the disk and of a grinding wheel such as, for example, the grinding wheel 5 of FIG. 1. On FIG. 3, a cross-section through the peripheral portion of the grinding wheel 17 designed to carry out lens grooving, and a cross-section through the peripheral portion of the disk 18 for renewing the surface, according to the invention, of this grinding wheel are shown. The grinding wheel 17 has a triangular rib 19 designed to form a groove in the lenses. The contour of the disk 18 can, for its part, be obtained starting from a disk with a plane peripheral surface, after an initial surface renewal operation on a grinding wheel, such as grinding wheel 17, the contour of which has not become deformed. The contour of grinding wheel 17 and in particular, the shape of the rib 19 are preserved when the disk 18 is used for surface renewal; the latter additionally supplies, after surface renewal, the pattern of the grinding wheel's contour which is thus obtained with high accuracy without the need to remove the grinding wheel. The pattern enables the optician to determine the presence of defects in the grinding wheel, using comparison with the theoretical contour to be obtained.

Figure 4:
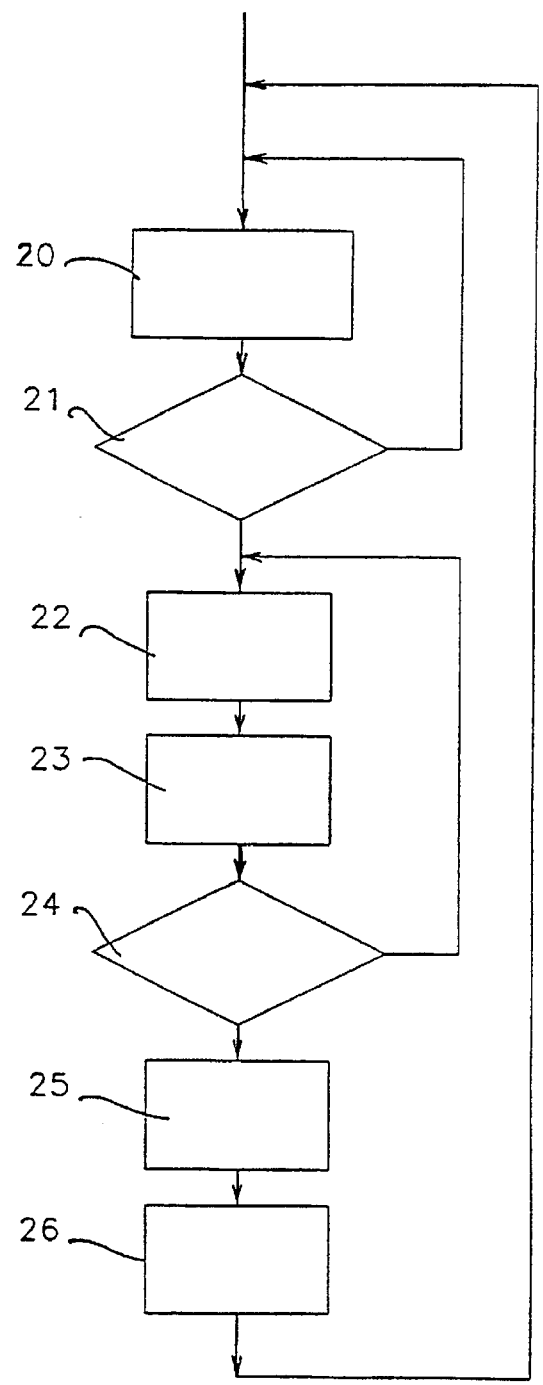
FIG. 4 is a flow chart of an automatic surface renewal program.

FIG. 4 is a flow chart showing the steps in the renewal method according to the invention. The flow chart in FIG. 4 is obviously only one example enabling the possible uses of the various elements of the invention to be clearly understood.

The machine according to the invention comprises means for detecting the wear of a grinding wheel. One example of an embodiment of said means is explained in detail with respect to the first two steps in the flow chart in FIG. 4.

At step 20, the machine measures the time needed to machine the lens. It is possible to measure the total time for the trimming and grooving/beveling operations or to measure each one of the durations independently. The duration is measured either using the internal clock of the microprocessor or using an external clock read by the microprocessor. The external clock can for example consist of quartz clock means.

At step 21, the measured duration is compared with the target value corresponding to the mean machining time for a worn grinding wheel. If the measured duration is less than the target value, the grinding wheel does not need re-sharpening and the machine is available for the next machining operation. If, however, the measured duration is above the target value, the grinding wheel has taken an abnormally long time to machine the lens and its surface can be considered as having become dull. Surface renewal can then start, this occurring at step 22. If this is not necessary, the control returns to step 20.

At step 22, the grinding machine displays a message indicating the need for surface renewal, for example through flashing of a lamp, or by display on a liquid crystal display or by any other means.

At step 23, the machine, thanks to the detection means incorporated therein, and the means for identifying the disk, detect the presence and the nature of said disk mounted in the gripping mean.

At step 24, it is determined whether the disk fitted in the gripping means is a suitable one. If this is not the case, control returns to step 22. If the disk is suitable, control proceeds to step 25. At step 25, the disk is positioned opposite the grinding wheel to be re-sharpened by a movement parallel to the axis of the grinding wheel as indicated by arrow 11 in FIG. 1.

At the next step 26, the grinding wheel and the disk are rotated and come into contact for the time needed to ensure surface renewal. Again, the period of time depends on the type of grinding wheel as well as on the nature of the disk and its possible wear.

The program then returns, after the grinding wheel surface has been renewed, to its starting point the machine being ready for use again.

The program shown in the flow chart of FIG. 4 is obviously able to be modified; thus, simultaneous re-sharpening of certain grinding wheels could be provided for, or any other variation thereon.

The wear on the grinding wheel can be detected, according to the invention, by means other than measuring the time needed to machine a lens, described above with reference to FIG. 4. Thus, one can also measure the power absorbed by the various motors during a lens grinding operation. The power is measured at step 20 of the flow chart in FIG. 4 instead of, or simultaneously with, measurement of machining time. The power consumed by the motor driving the grinding wheel in rotation and driving the gripping means 7, 8 in rotation is measured, the measurement being for example achieved through the use of voltage and/or current determining means for the drive motor.

At step 21 in the flow chart of FIG. 4, this measured power value is compared with a target value. As described above, depending on the result of the comparison, control either passes to step 22 or returns to step 20, optionally after a brief wait.

The power consumed by the motor during lens grinding allows wear of the wheel to be determined. When the grinding wheel has lost some of its abrasive power, the frictional forces between the wheel and the lens being ground increase and the torque the motor needs to supply increases correspondingly. Thus, wear of the grinding wheel is detected.

The power measurement can be one actual value or it can also be a mean value for a given number of lenses.

Wear of the grinding wheel can thus be measured.

Obviously, the prevent invention is not limited to the embodiments described and illustrated but may undergo various modifications available to those skilled in the art without this leading to a departure from the scope of the invention. In particular, the invention has been described for the very particular case of machines for grinding ophthalmic lenses. It is obvious that it can be adapted to a plurality of other types of grinding machines.

What is claimed is:

1. A method for renewing grinding wheel surfaces in a machine for grinding ophthalmic lenses, comprising one or several diamond grinding wheels, gripping means designed to receive an ophthalmic lens and control means, and comprising a step for detecting whether a surface of the grinding wheel needs renewing, and in which surface renewal is carried out using a disk of an abrasive material fitted on the grinding machine in the place of a lens in said gripping means for said lenses, further comprising a step for automatically detecting the presence and the composition and contour of disks fitted in said gripping means.

2. Method according to claim 1, wherein the step for detecting whether the surface of the grinding wheel needs renewing consists in measuring the time to machine an ophthalmic lens.

3. Method according to claim 1, wherein the step for detecting whether the surface of the grinding wheel needs renewing consists in measuring the power consumed by the means for driving the diamond grinding wheel in rotation.

4. Method according to claim 1, wherein the step for detecting whether the surface of the grinding wheel needs renewing consists in measuring the power consumed by the means for driving the gripping means in rotation.

5. Method according to claim 1, wherein the step for detecting whether the surface of the grinding wheel needs renewing consists in measuring the power consumed by the means for driving the diamond grinding wheel in rotation and by the means for driving the gripping means in rotation.

6. A method for renewing grinding wheel surfaces in a machine for grinding ophthalmic lenses, comprising one or several diamond grinding wheels, gripping means designed to receive an ophthalmic lens and control means, and comprising a step for detecting whether a surface of the grinding wheel needs renewing, and in which surface renewal is carried out using a disk of an abrasive material fitted on the grinding machine in the place of a lens in said gripping means for said lenses wherein the step for detecting whether the surface of the grinding wheel needs renewing consists in measuring the time to machine an ophthalmic lens.

7. A method for renewing grinding wheel surfaces in a machine for grinding ophthalmic lenses, comprising one or several diamond grinding wheels, gripping means designed to receive an ophthalmic lens and control means, and comprising a step for detecting whether a surface of the grinding wheel needs renewing, and in which surface renewal is carried out using a disk of an abrasive material fitted on the grinding machine in the place of a lens in said gripping means for said lenses, wherein the step for detecting whether the surface of the grinding wheel needs renewing consists in measuring the power consumed by the means for driving the diamond grinding wheel in rotation.

8. A method for renewing grinding wheel surfaces in a machine for grinding ophthalmic lenses, comprising one or several diamond grinding wheels, gripping means designed to receive an ophthalmic lens and control means, and comprising a step for detecting whether a surface of the gripping wheel needs renewing, and in which surface renewal is carried out using a disk of an abrasive material fitted on the grinding machine in the place of a lens in said gripping means for said lenses, wherein the step for detecting whether the surface of the grinding wheel needs renewing consists in measuring the power consumed by the means for driving the gripping means in rotation.

9. A method for renewing grinding wheel surfaces in a machine for grinding ophthalmic lenses, comprising one or several diamond grinding wheels, gripping means designed to receive an ophthalmic lens and control means, and comprising a step for detecting whether a surface of the grinding wheel needs renewing, and in which surface renewal is carried out using a disk of an abrasive material fitted on the grinding machine in the place of a lens in said gripping means for said lenses, wherein the step for detecting whether the surface of the grinding wheel needs renewing consists in measuring the power consumed by the means for driving the diamond grinding wheel in rotation and by the means for driving the gripping means in rotation.

10. A disk for carrying out a method for renewing grinding wheel surfaces in a machine for grinding ophthalmic lenses, comprising one or several diamond grinding wheels, gripping means designed to receive an ophthalmic lens and control means, and comprising a step for detecting whether the surface of the grinding wheel needs renewing, and in which surface renewal is carried out using a disk of an abrasive material fitted on the grinding machine in the place of a lens in said gripping means for said lenses, wherein at least the peripheral surface of said disk is constituted by an abrasive material, said disk including in its central portion means for providing coupling to the said gripping means of said machine, wherein it further comprises, at its central portion, identification means consisting of a plurality of holes.

11. The disk according to claim 10, wherein said abrasive materials consists of alumina or carborundum.

12. A disk for carrying out the method for renewing grinding wheel surfaces in a machine for grinding ophthalmic lenses, comprising one or several diamond grinding wheels, gripping means designed to receive an ophthalmic lens and control means, and comprising a step for detecting whether the surface of the grinding wheel needs renewing, and in which surface renewal is carried out using a disk of an abrasive material fitted on the grinding machine in the place of a lens in said gripping means for said lenses, wherein at least the peripheral surface of said disk is constituted by an abrasive material, said disk including in its central portion means for providing coupling to the said gripping means of said machine, wherein said abrasive materials consist of alumina or carborundum.

13. A machine for grinding ophthalmic lenses for renewing grinding wheel surfaces, comprising one or several diamond grinding wheels, gripping means designed to receive an ophthalmic lens and control means for controlling the rotation and the relative position of said grinding wheels and said lens, wherein it further comprises means for detecting whether the surface of the grinding wheel needs renewing or wheels by carrying out comparison with a target value for the time needed to machine the lens or for the power consumed by the means for driving said grinding wheel and said gripping means in rotation.

14. The machine according to claim 13, wherein it further comprises means for detecting the possible presence and the composition and contour of the disk for renewing the surface of said grinding wheels, fitted in said gripping means in the place of said lens.

15. The machine according to claim 14, wherein said detection means consists of a photoelectric cell and a light source.

* * * * *